United States Patent Office 3,426,163
Patented Feb. 4, 1969

3,426,163

STEREOPHONIC PHONOGRAPH PICKUPS WITH V-TYPE STYLUS TO TRANSDUCER COUPLER AND COUPLER DAMPER

Richard P. Muttick, Buchanan, Louis A. Di Vico, Elmsford, and Philip Kantrowitz, Bronx, N.Y., assignors to Sonotone Corporation, Elmsford, N.Y., a corporation of New York Filed Oct. 11, 1965, Ser. No. 494,737
U.S. Cl. 179—100.41 9 Claims
Int. Cl. H04r *1/16*

This invention relates to stereophonic phonograph pickups having a V-shaped stylus coupler with two coupler arms which resolve the stylus motion into two 90-degree displaced motion components that are transmitted to the two transducers. As an example, such V-type stylus coupler has been described in German Patent 971,346 of H. Batsch, issued Jan. 15, 1959.

Such stylus couplers have come into wide use with the general adoption of 45—45 stereo record discs in 1957. From their earliest use, their designers knew that each stylus arm transmits to its transducer a substantial undesirable portion of the stylus motion component transmitted by the other stylus arm to the other transducer due to the inherent inter-coupling between the two arms of such V-type stylus coupler. Such arm-intercoupling of the V-type stylus coupler caused substantial channel crosstalk or substantial reduction of the channel separation of the two channel signals delivered by their respective two transducers. Such disturbing crosstalk of the two stereo channel signals is particularly large and disturbing in and beyond the resonant frequency range of the two stereo-transducers.

Among the objects of the invention is such stereophonic pickup operating with a V-type stylus-to-transducers coupler operating with considerably higher signal channel separation in the resonant-frequency range of their transducers.

The present invention is based on the discovery that such disturbing crosstalk between the two channel signals may be substantially reduced or suppressed by placing in engagement with the stylus coupling portion of such V-type stylus coupler an elastomer damping body for subjecting it to damping action in the frequency range from somewhat below to materially above the resonant-frequency of each of the two substantially alike pickup transducers. Further, in accordance with the invention, such elastomer damping body should also engage and subject to its damping action the two outward coupling ends of the stylus coupler which maintain engagement with the two transducer ends to which they transmit the respective resolved stylus motion components.

The foregoing and other objects of the invention will be best understood from the following description of exemplifications thereof, reference being had to the accompanying drawings wherein.

Figure 1:
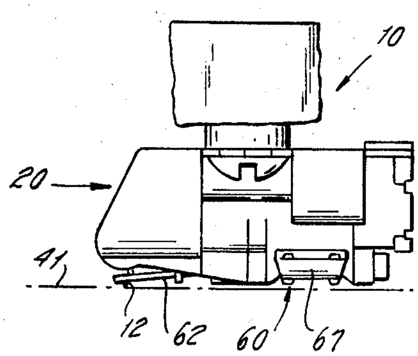
FIG. 1 is a side elevation of a stereophonic pickup of the invention as it is held by the tone arm in an operative position.
Figure 2:
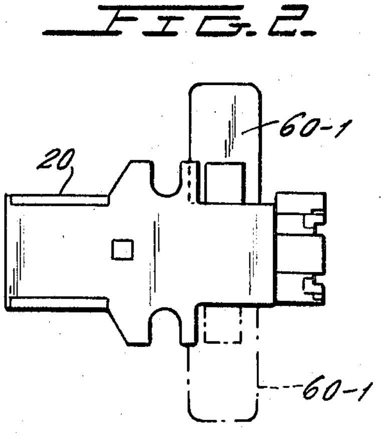
FIG. 2 is a top view of the pick of FIG. 1.

An example of a phonograph pickup with a V-shaped stylus-to-transducer coupler of the invention will be described in connection with a known type of stereophonic pickup shown in FIGS. 1–5. On a tone arm 10 of a conventional phonograph is mounted a stereophonic pickup having a casing or housing 20. Within the casing are mounted two mechanoelectric transducers of any known types such as electromagnetic or piezoelectric transducers. The pickup 20 has two piezoelectric transducers 21 held in casing compartments 52 in a conventional way as by embracing elastomer bodies 22. Each movable front portion of the two transducers 21 is coupled through a stereo coupler 40 to the stylus 12 so that proper distinct motion components of the stylus motion are transmitted to the two transducers 21 for generating the two stereo-signal sequences. The stereo coupler 40 may be of any known type, such as a V-type coupler disclosed in connection with FIG. 3 of German application T 11,092 published Dec. 13, 1956, now German Patent 971,346.

The coupler 40 has two divergent motion transmitting or driving arms 41–L, 41–R which are pivotally connected to the stylus coupling element 45 of coupler 40. The two stylus drive arms 41–L, 41–R are mutually perpendicular and under 45° to the plane of the record surface. The two movable coupling ends of the two transducers 21 are engaged by or seated in coupling ends or sleeves 42–L, 42–R of the two coupler arms 41–L, 41–R for transmitting properly resolved components of the stylus motion to the respective transducers 21.

The pickup shown has one or more styli 12, 12–1 held on a readily detachable or replaceable elongated stylus holder 60 having a strong stiff elongated seating member 67 and parallel elongated stylus rod member 62 carrying on its front end the styli 12, 12–1.

The stylus holder 60 shown is of the type described in U.S. patent application (SP–528) Ser. No. 207,902, filed July 6, 1962, entitled "Phonograph Pickups" in the name of Philip Kantrowitz now abandoned in favor of continuation application (SP–609) Ser. No. 470,339 filed July 1, 1965, now Patent No. 3,236,956, entitled "Phonograph Pickups" in the name of Philip Kantrowitz and assigned to the assignee of the present application. The seating member 67 is of the type described in copending application Ser. No. 238,674, filed Nov. 19, 1962, now Patent No. 3,182,136 and assigned to the assignee of the present invention.

The stylus rod 62 is relatively stiff and its rear end is held in operative position by an elastomer body 63 having a rear elastomer portion 63–1 affixed to front portion 69 as within a hollow space of seating member 67 and a front elastomer portion 63–2 affixed as by embracing the rear end 62–1 of stylus rod 62, as is the subject of aforementioned U.S. patent application Ser. No. 207,902. The elastomer body 63 is of relatively large cross-section approaching that of nearby seating member section 69 and it has an intermediate separator pivot portion 64 separating and interposed between the nearby end of seating member section 69 and stylus rod end 62–1 to permit wide flexing of stylus rod 62 such as 90° or more from is aligned operative position shown. The cross-section of elastomer separator body 63 is large enough to cause its elastic restoring forces to return the stylus rod 62 from a flexed position to its operative aligned transducer position coupling, and to maintain it in such latter position.

The junction portion 45 of the V-type coupler 40 has a downwardly facing coupling recess 46 shaped for detachable coupling thereto a portion of the stylus rod 62 as it is held by its seating member 67 in operative position on the pickup mounting structure of housing 20.

The seating member 67 of the stylus holder 60 is shaped for detachable seating in downward seat projections 81 of pickup housing 20. Each seat projection 81 of the casing has coaxial interior surfaces defining seats 82, with a downwardly facing gate opening 83 of smaller width than the seating recesses 82. Although it may have only one seating section, the seating member 67 shown has two rotary seating portions 68 shaped so that they may be readily inserted with small force into the outwardly opening seating recesses 82 of the casing 20. Alternatively, the seating member or section may be operatively retained in the housing seating recess by a retainer spring such as described in U.S. Patent 2,717,929. The stylus-holder seating member 67 also has a front section 69 and a rear section 70 of different widths than its seating sections 68 which fix the axial position of the seating member 67 and stylus holder 60 on the pickup housing 20. The seating member 67 has a handle 60–1 for rotating the stylus holder 60 around its longitudinal axis in the housing seating recess 82. The handle 60–1 has handle arms with lateral stop projections to stop the handle in either one of two oppositely turned end positions (FIGS. 2–4) and fix the operative position of either one of the two styli 12, 12–1.

In the form shown, there are a pair of axially spaced casing projections 81, each having an interior seating surface 82 and a narrower gate opening 83. The seating sections 68 of the stylus holder 60 are of elastically deformable material having sufficient stiffness and rigidity for enabling inward insertion of the seating sections 68 through the narrower gate openings 83 into the seating recesses 82 of housing 20 and also assuring that the normally greater width of the seating portions 68 will be retained and guided for rotation in the operative position within the cylindrical seating recesses 82.

In playing back a stereophonic record, the composite motion imparted by the two record faces to the stylus 12 are transmitted to the junction portion 45 of the stylus-transducer coupler 40. Ideally, this composite stylus motion should be resolved by the two stylus arms 41–L and 41–R into two distinct motion components imparted to the two transducers 21; and the resulting transducer motion should generate two distinct signal sequences corresponding to the distinct records of the two angularly disposed groove faces.

In practice, it is impossible to provide such ideal stereo stylus-transducer couplers, and a substantial fraction of one distinct stylus motion component transmitted, for example, by coupler arm 41–R is also transmitted by coupler junction 45 to its other coupler arm 41–L, thereby causing disturbing cross coupling of the two stereo transducers and disturbing crosstalk in their two generated distinct stereo signal sequences.

Figure 5:
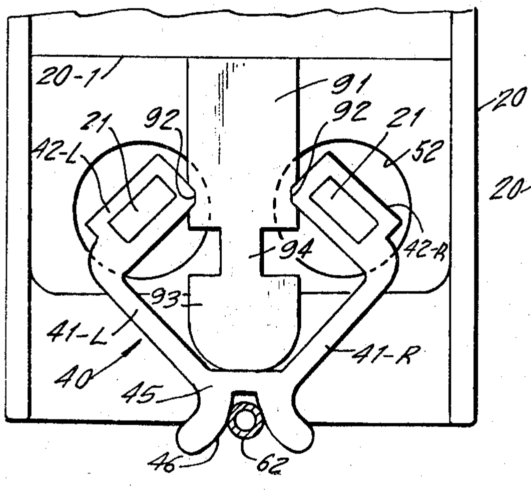
FIG. 5 is an enlarged front view of the front side of the pickup along lines 5—5 of FIG. 4 showing a known V-type stylus-to-transducer coupler combined with an elastomer or rubber-like damper body in accordance with the invention.
Figure 7:
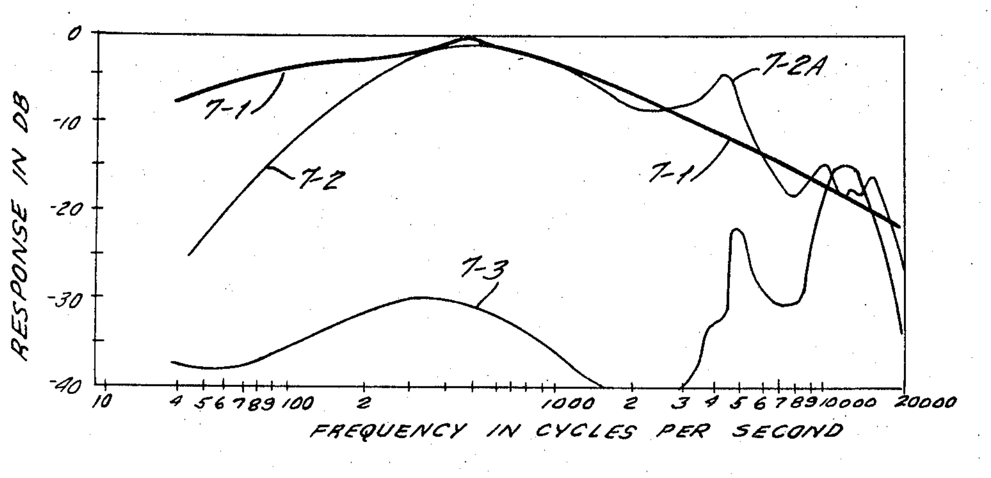
FIG. 7 is a representative response curve of a pickup of the type shown in FIGS. 1 to 5, without the combination of the V-type coupler with a coupler damper of the invention, such as shown in FIGS. 1 to 5.

As an example, the response curves of FIG. 7 show the extent to which the signals played back by the playback channel of the right-hand transducer 21 (as seen in FIG. 5) generate a disturbing crosstalk signal in the left-hand transducer playback channel principally because of intercoupling of the two coupler arms 41–L and 41–R in transmitting the two distinct stylus-motion components to the two transducers 21.

In FIG. 7, response curve 7–1 represents the desired ideal playback response in decibels of a pickup transducer which faithfully reproduces a phonograph groove recording made in accordance with the Standard Recording and Reproducing Characteristic adopted by the Record Industry Association of America, Inc. (1 E. 57th St., New York, N.Y. 10022). For a stereophonic pickup of the invention, it is assumed that curve 7–1 represents the desired ideal playback response of the right-channel transducer 21. Curve 7–2A shows the actual playback response of the same right-channel transducer 21 obtained with a pickup lacking the damper of the present invention. Curve 7–3 shows the crosstalk response generated by the other or left-hand transducer 21 without any material motion being imparted to the stylus by the left-hand groove channel while playing back a record recorded only on the right-channel of the record groove. Similar conditions hold for reproducing a left-channel recording from a groove which lacks any right-channel signal records. From FIG. 7, it is seen that in the frequency region from somewhat below to materially above the transducer resonance frequency at 7–2A, such as from 4500 c.p.s. to about 18,000 c.p.s., the crosstalk signal rises to high levels For the proper explanation of the features of the invention, it is desirable to first give the principal visco-elastic properties or characteristics of organic polymers which are used for the V-type stylus couplers and for the damping bodies of the invention. For a fuller explanation of the visco-elastic properties of such polymers reference is made to the following publications:

Visco-elastic Properties of Polymers, by John D. Ferry, copyright 1961;

Article by A. W. Nolle in Journal of Polymer Science, vol. V, pp. 1–54 (1948); and Technical Information Sheet No. 25, ELD–14635, Enjay Butyl Rubber for Automotive Dynamic Applications, by R. M. Cardillo, published Mar. 31, 1959.

The storage or real part of the dynamic modulus of a polymer is defined as the stress in phase with the strain in a sinusoidal deformation of the polymer divided by the strain. It is a measure of the energy stored and recovered per cycle, when different polymers are compared at the same strain amplitude. The dynamic modulus has dimensions of dynes/cm.$^2$ or p.s.i.

The real component of the dynamic viscosity of a polymer is equal to the imaginary part of the dynamic modulus divided by angular frequency in radians per second of the applied vibrations.

The loss tangent or loss factor of a polymer is the ratio of the energy lost to the energy stored in a vibration cycle of the polymer.

In general, the highly crystalline polymers below their melting temperature and below their glass transition temperature have a storage modulus of $10^{10}$ to $10^{13}$ dynes/cm.$^2$. The loss factor of such polymers below the glass transition temperature is about $10^{-2}$ to $10^{-1}$, independently of the applied vibration frequency.

The storage modulus and loss factor of elastomers above the glass transition temperature depends on their crosslinks. Their storage moduli ranges are between $10^5$ to $10^8$ dynes/cm.$^2$ and their loss factors are approximately $10^{-2}$. In the glass transition range, the loss factor of elastomers increases to from 1 to 10. The real part of the dynamic viscosity of elastomers ranges from $10^{-2}$ to $10^{12}$ poises up to very high vibration frequencies including the entire audio frequency range.

In the table below are given the data for different polymers for the frequency range 1000 to 5000 cycles per second, suitable for making the V-type transducer coupler body.

| Polymer | Storage modulus, dynes/cm.$^2$ | Loss factor | Real part of viscosity poise |
|---|---|---|---|
| Polyethylene and nylon | $10^{10}$–$10^{11}$ | $10^{-1}$–$10^{-2}$ | $10^4$–$10^6$ |
| Butyl elastomer | $10^7$–$1.5\times10^8$ | 1–2 | $10^3$–$10^4$ |
| Neoprene elastomer | $10^7$–$10^9$ | 1–4 | $10^3$–$10^5$ |
| Polyurethane elastomer | $10^7$–$10^8$ | 1–2 | $10^3$–$10^5$ |

The foregoing elastomer polymers are suitable for making the V-type coupler provided that the selected elastomer is compounded or chosen to have a dynamic viscosity of 1000 poises or higher with at least 0 durometer hardness and a corresponding relatively high dynamic modulus. Good results are obtainable with couplers made with neoprene of 80 durometer; with polyurethane of 90 to 100 durometer, and butyl elastomers of 50 to 80 durometer hardness. Satisfactory results are also obtained with V-type couplers made of plastic having materially greater hardness than the above specified elastomers, such as nylon, polyethylene, polyproylene and the like.

Such elastomers are compounded and selected to have at most 40 durometer hardness, a corresponding relatively low storage modulus of $10^6$ to $10^7$ dynes/cm.$^2$ and a dynamic viscosity of $10^2$ to $10^3$ poises. Such elastomers are suitable for making the damper body of a V-type coupler system of the invention. Very good results are obtained with a butyl elastomer damper body having a dynamic modulus of $10^6$ to $10^7$ dynes/cm.$^2$, a loss factor of 1 to 2, a dynamic viscosity of 100 to 1000 poises and a hardness of 10 to 30 durometer.

Technical Information Sheet #36, ELD–17037 of Enjay Laboratories contains data for producing butyl elastomers which have high damping characteristics combined with selected high or low resilience and high or low dynamic modulus. This information Sheet #36 also contains tabulated data relating the polymer hardness to its dynamic modulus at room temperature. The dynamic modulus of polymer increases as the durometer hardness range is varied from 40 hardness to 70 hardness.

Figures 3, 4:
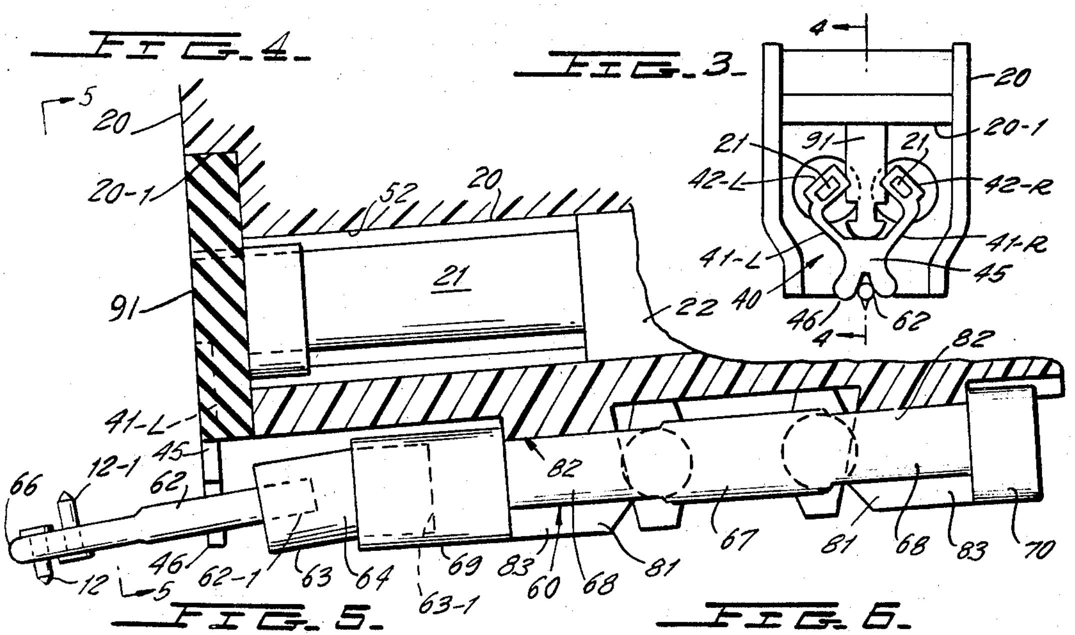
FIG. 3 is a front elevation of the same pickup without its cover and bracket.
FIG. 4 is a longitudinal cross-section of the pickup along line 4—4 of FIG. 3.

One form of the invention is shown in the examples of FIGS. 3 to 5. An elastomer body 91 exhibiting high viscous damping is held in damping engagement at 92 with extensive adjacent surface portions of the two coupler portions 42–L, 42–R of the coupler 40. In addition, the damper body 91 has downward portion 93 engaging the facing upper surface of coupler junction 45 for subjecting it to its damping action. To assure positive damping action on coupler junction 45, the upper surface of damper body 91 is wedged against the overlying surface of housing shoulder 20–1 (FIGS. 3, 4, 5). The proper combination of damping and compliance may be readily achieved by reducing the width of an intermediate or overlying elastomer body portion of indicated by its narrower damper section 94.

Figure 6:
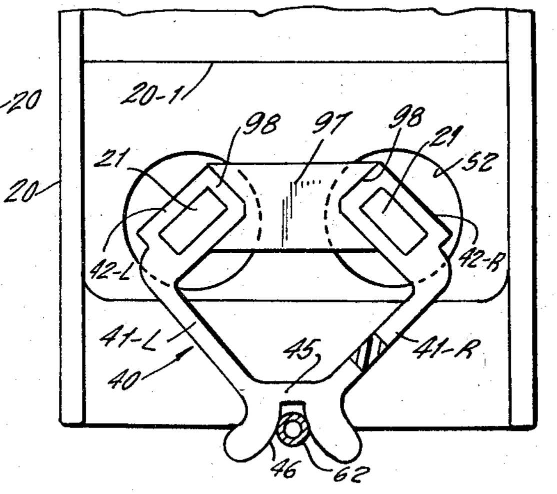
FIG. 6 is an enlarged front view similar to FIG. 5 showing a similar V-type coupler combined with another form of elastomer damper body in accordance with the invention.

FIG. 6 (which is similar to FIG. 5) shows a system of the invention operating with a modified form of damper body 97 for an identical transducer coupler 40. Damper body 97 extends between the two laterally spaced coupler end collars 42–L, 42–R of the coupler 40. Two extensive opposite angularly shaped damper surfaces 98 have damping engagement with corresponding large surfaces of the two coupling collars or sleeves 42–L, 42–R of the coupler 40.

Figure 8:
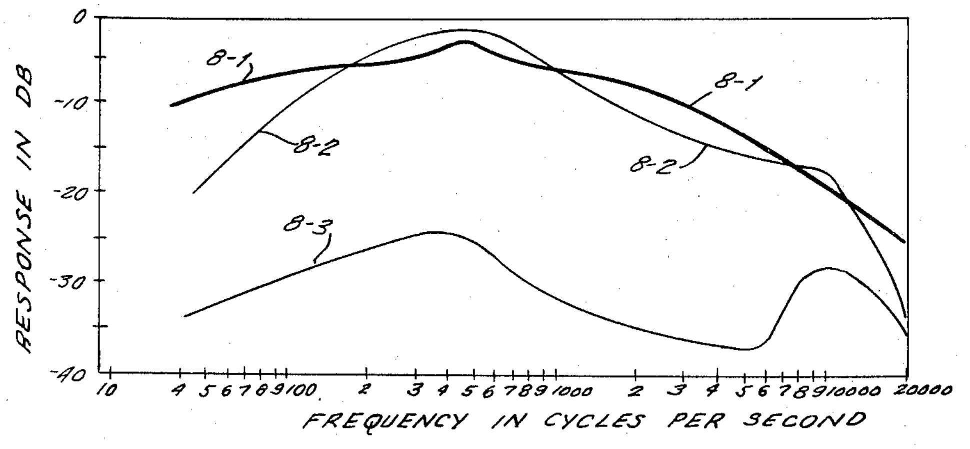
FIG. 8 is a similar response curve of a pickup of the invention as described in connection with FIGS. 3 to 5.

An example of the operation of a system of the invention operating with a damper body of the type shown as 91 in FIGS. 3 to 5 is illustrated by the response curves of FIG. 8.

Figure 9:
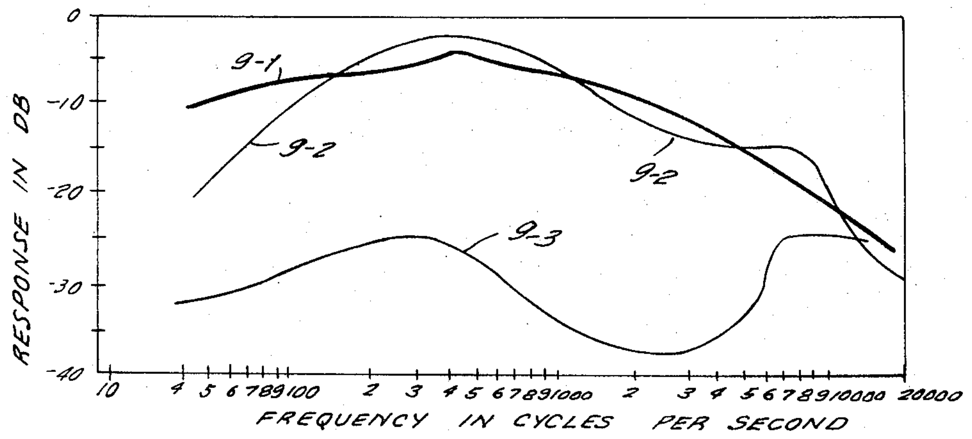
FIG. 9 is a similar response curve of a modified pickup of the invention as described in connection with FIG. 6.

In FIG. 8, response curves 8–1, 8–2 and 8–3 correspond to curves 7–1, 7–2, 7–3 of FIG. 7, and represent analogous operating conditions obtained with a system of the invention having a damper body such as shown at 91 in FIGS. 3–5. In FIG. 9, response curves 9–1, 9–2 and 9–3 are analogous to curves 8–1, 8–2 and 8–3, which have been obtained with a system of the invention having a damper body such as shown at 97 in FIG. 6.

As shown in FIG. 8, the system of FIGS. 3–5 materially increases channel separation in the frequency range of armature resonance and above. As shown in FIG. 9, the system of FIG. 6 materially increases channel separation in the frequency range of armature resonance and above.

The principles underlying the invention described in connection with specific exemplifications will suggest other modifications and applications thereof. It is accordingly desired that the appended claims shall not be limited to specific examples shown or described herein.

The embodiments of the invention in which an exclusive privilege or property is claimed are defined as follows:

1. In a stereophonic phonograph pickup for playing back two distinct but related record undulations extending along different faces of a record groove;

a stylus arranged to be driven by said two distinct record undulations;

a mounting structure carrying said stylus;

two laterally spaced distinct mechano-electric transducers operatively carried by said mounting structure and each having a movable transducer portion for generating signals corresponding to transmitted motion;

a motion transmitting integrally formed coupling member having a junction element driven by said stylus and, two divergent drive arms extending from said junction element and each having remote coupler ends engaging respectively one of said two movable transducer portions for transmitting the two distinct motion components of said stylus to their respective distinct movable transducer portions and generating corresponding two distinct signal sequences;

each of said transducers having a predetermined transducer audio resonant frequency;

and a distinct elastomer damping body held in damping engagement with a substantial surface portion of each of said two laterally spaced coupler ends;

said coupling member being integrally formed of solid substance selected from plastic and elastomeric polymers, said elastomer damping body being formed of an elastomer polymer other than and distinct from the polymer of said coupling member and causing material suppression of crosstalk between said two transducers and said two distinct signal sequences in the frequency range near and materially above said transducer resonant frequency.

2. In a stereophonic phonograph pickup as claimed in claim 1, said stylus being part of an elongated stylus holder detachably held by said mounting structure, said coupler junction element having a coupling recess arranged to detachably engage a longitudinal element of said stylus holder for transmitting the motion of said stylus to said coupler drive arms.

3. In a stereophonic phonograph pickup as claimed in claim 1, the polymer of said damping body having a hardness and storage modulus lower than the polymer of said coupling member, said stylus being part of an elongated stylus holder detachably held by said mounting structure, said coupler junction element having a coupling recess arranged to detachably engage a longitudinal element of said stylus holder for transmitting the motion of said stylus to said coupler drive arms.

4. In a stereophonic phonograph pickup as claimed in claim 1, the polymer of said dumping body having a hardness of at most 40 durometers and corresponding low storage modulus lower than that of said coupling member, said stylus being part of an elongated stylus holder detachably held by said mounting structure, said coupler junction element having a coupling recess arranged to detachably engage a longitudinal element of said stylus holder for transmitting the motion of said stylus to said coupler drive arms.

5. In a stereophonic phonograph pickup as claimed in claim 1, said damping body having also a surface portion held in engagement with a portion of said mounting structure.

6. In a stereophonic phonograph picked as claimed in claim 1, said damping body having also a surface portion held in engagement with a portion of said mounting structure, the polymer of said damping body having a hardness and storage modulus lower than the polymer of said coupling member, said stylus being part of an elongated stylus holder detachably held by said mounting structure, said coupler junction element having a coupling recess arranged to detachably engage a longitudinal element of said stylus holder for transmitting the motion of said stylus to said coupler drive arms, said damping body having also a surface portion engaging a portion of said coupler junction element.

7. In a stereophonic phonograph pickup as claimed in claim 1, the polymer of said damping body having a hardness and storage modulus lower than the polymer of said coupling member.

8. In a stereophonic phonograph pickup as claimed in claim 7, the polymer of said damping body having a hardness of at most 40 durometers and corresponding low storage modulus.

9. In a stereophonic phonograph pickup as claimed in claim 8, the polymer of said damping body having a dynamic viscosity of at least 100 poises.

References Cited

UNITED STATES PATENTS

| | | | |
|---|---|---|---|
| 3,060,280 | 10/1962 | Wood | 179—100.41 |
| 3,113,783 | 12/1963 | Zimmermann et al. | 179—100.41 |
| 3,177,300 | 4/1965 | Dieter et al. | 179—100.41 |

OTHER REFERENCES

Hirsch, New Stereo Pickups, Radio-Electronics, September 1960, pp. 30–33.

STANLEY M. URYNOWICZ, Jr., *Primary Examiner.*

R. F. CARDILLO, *Assistant Examiner.*

U.S. Cl. X.R.

274—37